United States Patent [19]

Nomoto et al.

[11] 3,746,786

[45] July 17, 1973

[54] NOISE DETECTING CIRCUIT FOR TELEVISION RECEIVERS AND THE LIKE

[75] Inventors: Yoshihisa Nomoto; Masanori Oguino, both of Yokohama; Seiichi Ueda, Kodaira-shi; Sadao Kitamura, Kamakura-shi, all of Japan

[73] Assignee: Hitachi, Ltd., Tokyo, Japan

[22] Filed: Apr. 25, 1972

[21] Appl. No.: 247,383

[30] Foreign Application Priority Data

April 30, 1971 Japan............................46/27962

[52] U.S. Cl.... 178/7.3 S, 178/7.3 DC, 178/DIG. 12

[51] Int. Cl. .............................................. H04n 5/08

[58] Field of Search................... 178/DIG. 12, 7.3 S, 178/7.3 DC, 7.3 R, 7.5 S, 7.5 DC, 7.5 R

[56] References Cited

UNITED STATES PATENTS 3,441,669 4/1969 Janson et al. ................. 178/7.3 DC 3,700,803 10/1972 Rhee................................ 178/7.3 R

*Primary Examiner*—Robert L. Richardson

*Attorney*—Paul M. Craig, Jr., Donald R. Antonelli et al.

[57] ABSTRACT

A noise detecting circuit for television receivers comprises a pair of transistors whose emitters are connected to a constant current circuit so as to maintain constant the sum of the emitter current of the pair of transistors. Composite video signals are supplied to the base on the first transistor in the pair and a DC voltage whose value is proportional to synchronizing signals contained in the composite video signals is supplied to the base of the second transistor in the pair. A pulse is taken out from the collector of the first transistor when noise whose value is greater than the DC voltage is supplied to the base of the first transistor. The pulse is used to cancel the noise generated in a synchronizing signal separating circuit.

10 Claims, 2 Drawing Figures

NOISE DETECTING CIRCUIT FOR TELEVISION RECEIVERS AND THE LIKE

BACKGROUND OF THE INVENTION

1. Field of the Invention

This invention relates to noise detecting circuits for television receivers, and more particularly it concerns noise detecting circuits suitable for television receivers incorporating integrated circuits.

2. DESCRIPTION OF THE PRIOR ART

In the usual noise detecting circuit in television receivers, composite video signals are compared with a constant voltage, and if noise whose amplitude is greater than the constant voltage is contained in the composite video signal, a pulse is generated to cut inputs to automatic gain controlling circuit and synchronizing signal separating circuit during the period of the noise.

However, such conventional noise detecting circuit can not detect noise if the synchronizing signal level is excessively reduced with decrease of field intensity around antenna. Also, if the synchronizing signal level is excessively increased, not only noise but also synchronizing signal is detected, which has adverse effects on the automatic gain control circuit and synchronizing signal separating circuit.

SUMMARY OF THE INVENTION

An object of the invention is to provide a novel and useful noise detecting circuit for television receivers.

Another object of the invention is to provide a noise detecting circuit for television receivers, which is capable of reliably detecting noise irrespective of variations of the synchronizing signal level.

A further object of the invention is to provide a noise detecting circuit for television receivers, which is simple in construction and can cancel noise taken out of the synchronizing signal separating circuit.

A still further object of the invention is to provide a noise detecting circuit, which is simple in construction and can prevent noise from entering the automatic gain control circuit.

According to the present invention, there is provided a noise detecting circuit for television receivers comprising:

a first transistor; a second transistor;

a constant current circuit connected to the emitters of said first and second transistors for maintaining constant the sum of the emitter currents of said first and second transistors;

means for supplying composite video signals to the base of said first transistor;

DC voltage generating means for supplying a DC voltage whose value is proportional to the peak value of synchronizing signals contained in said composite video signals to the base of said second transistor; and means for taking out noise from one of the collectors of said first and second transistors when noise whose amplitude is greater than said DC voltage is supplied to the base of said first transistor.

DESCRIPTION OF THE PREFERRED EMBODIMENT

Figure 1:
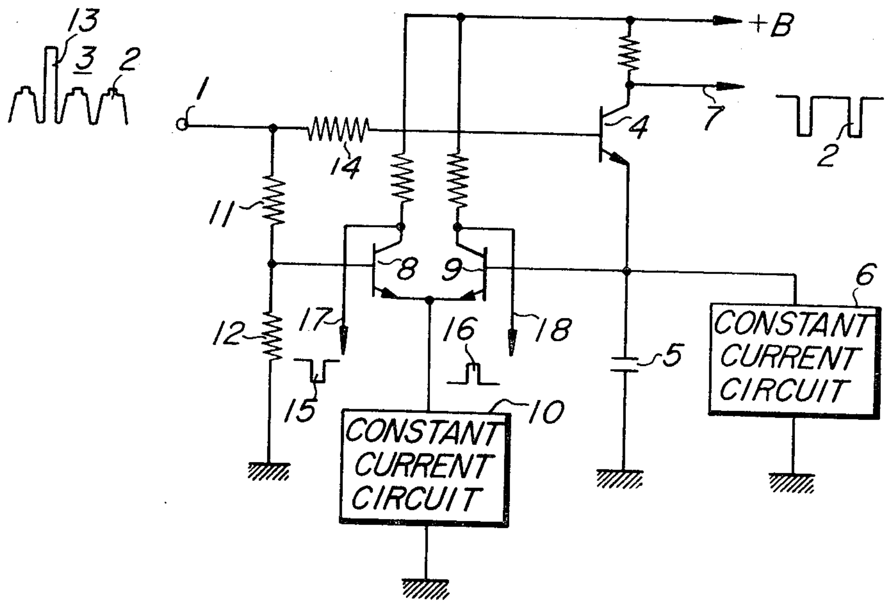
FIG. 1 is a circuit diagram showing the noise detecting circuit embodying the invention.

FIG. 1 shows the basic construction of the noise detecting circuit according to the invention. Referring to the Figure, reference numeral 1 designates an input terminal, to which a composite video signal generally designated at 3 including synchronizing signal 2 of positive polarity is added. The composite video signal coupled to the input terminal 1 is supplied to the base of a synchronizing signal separator transistor 4. The transistor 4 is turned conducting with the peak value of the synchronizing signal 2, whereby a DC voltage proportional to the peak value of the synchronizing signal contained in the composite video signal is provided by a circuit consisting of capacitor 5 and constant current circuit 6, while the synchronizing signal 2 is taken out of a terminal 7. Numerals 8 and 9 designate noise detecting transistors constituting a differential amplifier. The emitters of the transistors 8 and 9 are commonly connected through a constant current circuit 10 to ground. Resistors 11 and 12 constitute a voltage divider to divide the voltage of the composite video signal input, and the output of this voltage divider is coupled to the base of the transistor 8. Supplied to the base of the other transistor 9 is the DC voltage produced by the circuit of capacitor 5 and constant current circuit 6 in proportion to the peak value of the synchronizing signal in the composite video signal input.

In accordance with the invention, the composite video signal input voltage is divided between the resistors 11 and 12 such that the synchronizing signal peak component of the division voltage supplied to the base of the transistor 8 is slightly lower than the base voltage on the transistor 9.

Thus, if the composite video signal input to the terminal 1, that is, the signal supplied to the base of the transistor 8, does not contain any noise, the transistor 8 is "off" while the transistor 9 is "on," for the base voltage on the transistor 8 is lower than that on the transistor 9.

If the composite video signal 3 supplied to the input terminal 1 contains noise 13 whose amplitude is greater than the synchronizing signal 2, the terminal voltage across the capacitor 5 rises according to a time constant determined by the resistance of the resistor 14 and capacitance of the capacitor 5. In this embodiment, the capacitance of the capacitor 5 is selected to be large enough, so at upon appearance of noise greater than the synchronizing signal level the terminal voltage across the capacitor 5 changes only a little whereas the base voltage on the transistor 8 sharply increases and surpasses the base voltage on the transistor 9. As a result, the transistor 8 is triggered while the transistor 9 is cut off, thus producing a negative pulse 15 from the collector of the transistor 8 while producing a positive pulse 16 from the collector of the transistor 9. The negative and positive pulses 15 and 16 thus produced are taken out of respective terminals 17 and 18. These pulses are supplied to noise inverting means provided in the automatic gain control circuit and synchronizing signal separating circuit for cancellation of noise, as will be described hereinafter in detail in connection with FIG. 2.

Figure 2:
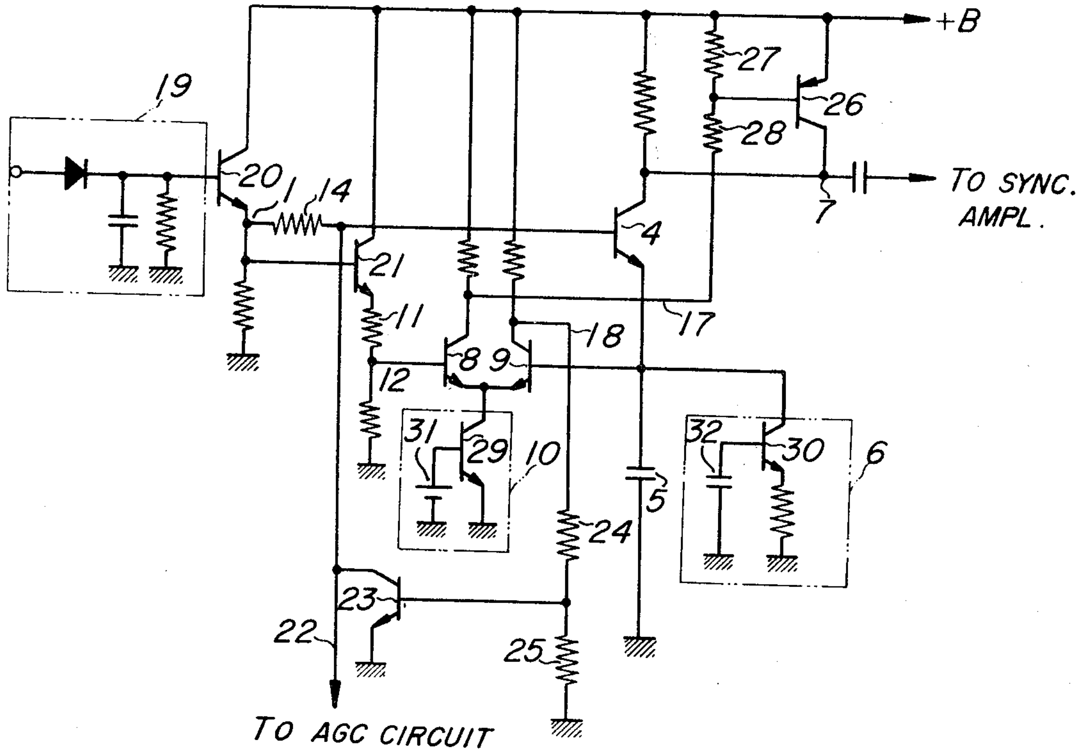
FIG. 2 is a circuit diagram showing an embodiment of the noise detecting circuit according to the invention.

FIG. 2 shows an embodiment of the noise detecting circuit according to the invention. Referring to the Figure, numeral 19 designates a video detector, numeral 20 a video amplifier transistor, and numeral 21 a transistor for impedance conversion.

The composite video signal output of the video detector 19 is coupled through the transistors 20 and 21 with the voltage divider of resistors 11 and 12, and the output of the voltage divider is fed to the base of the transistor 8. The base of synchronizing signal separator transistor 4 is connected to a terminal 22 connected to an automatic gain control circuit (hereinafter referred to as AGC) not shown. Thus, the composite video signal is coupled through the terminal 22 with the AGC. The terminal 22 is also connected to ground through a noise inverter transistor 23. Supplied to the base of the transistor 23 is an output voltage of a voltage divider of resistors 24 and 25 which are provided for dividing the voltage taken out of the collector of the transistor 9. Connected between terminal 7 and power supply (labeled +B) is another noise inverter transistor 26. Supplied to the base of the transistor 26 is an output voltage of a voltage divider of resistors 27 and 28 which are provided for dividing the collector voltage of the transistor 8. Numerals 29 and 30 designate constant current generation transistors, and numerals 31 and 32 base bias sources.

In operation, if the composite video signal input to terminal 1 is free from any noise, the transistor 8 is held in the "off" state and the transistor 9 in the "on" state, as has been described earlier in connection with the FIG. 1 circuit. In this situation, the transistors 23 and 26 are both "off." Thus, the composite video signal is supplied through the terminal 22 to the AGC, while the synchronizing signal is supplied through the terminal 7 to a synchronizing amplifier (not shown).

If noise whose amplitude is greater than the synchronizing signal level is introduced, it cause triggering of the transistor 8 and cutting-off of the transistor 9, as described earlier in connection with the FIG. 1 circuit, thus causing a negative pulse to appear at the collector of the transistor 8 and a positive pulse at the collector of the transistor 9. The positive pulse generated at the collector of the transistor 9 is coupled through the voltage divider of resistors 24 and 25 with the base of the transistor 23 to trigger the transistor 23, thus grounding the terminal 22. Thus, during the noise period the noise is not transmitted to the AGC.

Meanwhile, the negative pulse generated at the collector of the transistor 8 is coupled through the voltage divider of resistors 27 and 28 to the base of the transistor 26 to trigger the transistor 26, thus rendering the potential on the terminal to be substantially equal to the source voltage of +B (volts). Thus, during the noise period the noise is not transmitted through the terminal 7 to the succeeding state synchronizing amplifier (not shown).

The noise detecting circuit as described above according to the invention has the following advantages:

1. Since a DC voltage generated through the circuit of transistor 4, capacitor 5 and constant current circuit 6 in proportion to the peak value of the synchronizing signal 2 is used as a reference voltage supplied to the base of the transistor 9 for detecting noise 13, the reference voltage, i.e., the base voltage on the transistor 9 varies in accordance with the level of the composite video signal input 3 to the terminal 1, i.e., the synchronizing signal level 2, so that it is possible to ensure reliable noise detection and cancellation irrespective of variations of the composite video signal input level.
2. With the prior-art noise detecting circuit where a constant voltage is used as reference voltage, the AGC will not provide AGC control signal in such cases as sudden appearance of the input signal as occurs when closing the television receiver power source switch. In such case, the amplifiers (r-f and i-f amplifiers) are rendered into the maximum gain state, causing input signals of exceptionally high levels to be impressed on the base of the noise detecting transistor, thus resulting in mal-functioning of the noise detecting circuit to cut transmission of the composite video signal 3 to the AGC, and the normal state cannot be recovered inasmuch as the amplifiers remain in the maximum gain state. In the noise detecting circuit according to the invention, the terminal voltage across the capacitor 5, that is, the base voltage on the transistor 9, increases in proportion to the input level, so that the voltage level on the base of the transistor 8 corresponding to the peak of the synchronizing signal 2 contained in the composite video signal 3 is always lower than the base voltage on the transistor 9. Thus, the noise detecting circuit will never mal-function to ensure steady control of the amplifier gain with the AGC voltage provided from the AGC.
3. While in the prior-art noise detecting circuit having resort to a constant reference voltage a smoothing circuit including resistors and large capacitance capacitors is required, in the noise detecting circuit according to the invention the DC voltage generated by the DC voltage generating circuit required for the synchronizing separator circuit is used as the reference voltage for noise discrimination, so that any particular resistors or capacitors for the sole purpose of generating the reference voltage can be dispensed with. In other words, according to the invention it is necessary to provide only a single large capacitance capacitor 5. Thus, when integrating the noise detecting circuit into semiconductor integrated circuit it is only the capacitor 5 that should be externally provided, so that greater simplicity of circuit construction can be featured.
4. When fabricating the circuit of FIG. 2 into a semiconductor integrated circuit, the circuit parameters may be set such that the sum of the base-emitter voltages of the transistors 21 and 8 will be substantially equal to the sum of the base-emitter voltages of the transistors 4 and 9, so that it is possible to ensure temperature stability of the noise detecting circuit.

We claim:

1. A noise detecting circuit for television receivers comprising;

a first transistor; a second transistor;

a constant current circuit connected to the emitters of said first and second transistors for maintaining constant the sum of the emitter currents of said first and second transistors;

means for supplying composite video signals to the base of said first transistor;

DC voltage generating means for supplying a DC voltage whose value is proportional to the peak value of synchronizing signals contained in said composite video signals to the base of said second transistor;

means for taking out noise from one of the collectors of said first and second transistors when noise whose amplitude is greater than said DC voltage is supplied to the base of said second transistor.

2. A noise detecting circuit for television receivers comprising;

composite video signal generating means for generating composite video signals;

a synchronizing signal separator having a first terminal connected to said composite video signal generating means for supplying with video signals, a second terminal for taking out synchronizing signals therefrom and a third terminal;

DC voltage generating means connected to said third terminal of said separator for generating a DC voltage whose value is proportional to the peak value of said synchronizing signals;

a pair of transistors whose emitters are connected together, and the base of the first transistor in said pair being connected to said composite video signal generating means for supplying with said composite video signals and the base of the second transistor in said pair being connected to said DC voltage generating means for supplying with said DC voltage;

means for taking out noise from one of the collectors of said first and said second transistors in said pair when noise whose amplitude is greater than said DC voltage is supplied to the base of the first transistor.

3. A noise detecting circuit for television receivers comprising;

a video amplifier for amplifying composite video signals;

a synchronizing signal separator having a first terminal which is connected to said video amplifier for supplying with composite video signals, a second terminal for taking out synchronizing signals therefrom and a third terminal;

DC voltage generating means connected to said third terminal of said separator for generating a DC voltage whose value is proportional to the peak value of said synchronizing signals;

a pair of transistors whose emitters are connected to a constant current circuit so as to maintain constant the sum of the emitter current in said pair, and the base of the first transistor in said pair being connected to said video amplifier for supplying with, said composite video signals, and the base of the second transistor in said pair being connected to said DC voltage generating means for supplying with said DC voltage;

means for taking out a pulse from one of the collectors of said first and said second transistors when noise whose amplitude is greater than said DC voltage is supplied to the base of said first transistor.

4. A noise detecting circuit for television receivers comprising;

a video amplifier for amplifying composite video signals;

a synchronizing signal separator having a first terminal which is connected to said video amplifier for supplying with composite video signals, a second terminal for taking out synchronizing signals therefrom and a third terminal;

DC voltage generating means connected to said third terminal of said separator for generating a DC voltage whose value is proportional to the peak value of said synchronizing signals;

a pair of transistors whose emitters are connected to a constant current circuit so as to maintain constant the sum of the emitter current in said pair, and the base of the first transistor in said pair being connected to said video amplifier for supplying with said composite video signals, and the base of the second transistor in said pair being connected to said DC voltage generating means for supplying with said DC voltage;

means for taking out a pulse for from the collector of said first transistor when noise whose amplitude is greater than said DC voltage is supplied to the base of the said first transistor in said pair;

a noise inverter which is connected between said second terminal of said separator and a power source being responsive to said pulse supplied from the collector of said first transistor in the pair so as to cancel noise generated to said second terminal of said separator.

5. A noise detecting circuit for television receivers comprising;

a video amplifier for amplifying composite video signals;

a synchronizing signal separator having a first terminal which is connected to said video amplifier for supplying with composite video signals, a second terminal for taking out synchronizing signals therefrom and a third terminal;

DC voltage generating means connected to said third terminal of said separator for generating a DC voltage whose value is proportional to the peak value of said synchronizing signals;

a pair of transistors whoes emitters are connected to a constant current circuit so as to maintain constant the sum of the emitter current in said pair, and the base of the first transistor in said pair being connected to said video amplifier for supplying with said composite video signals and the base of the second transistor in said pair being connected to said DC voltage generating means for supplying with said DC voltage;

means for taking out a pulse for from the collector of said second transistor when noise whose amplitude is greater than said DC voltage is supplied to the base of said first transistor;

a first noise inverter which is connected between an input terminal of an automatic gain controlling circuit which is connected to said video amplifier and ground being responsive to said pulse so as to cancel noise contained in said composite video signals supplied to said automatic gain controlling circuit.

6. A noise detecting circuit for television receivers comprising;

a video amplifier for amplifying composite video signals;

a synchronizing signal separator having a first terminal which is connected to said video amplifier for supplying with video signals, a second terminal for taking out said synchronizing signals therefrom and a third terminal;

DC voltage generating means connected to said third terminal of said separator for generating a DC voltage whose value is proportional to the peak value of said synchronizing signals;

a pair of transistors whose emitters are connected to a constant current circuit so as to maintain constant the sum of the emitter current in said pair, and the base of the first transistor in said pair being connected to said video amplifier for supplying with said composite video signals, and the base of the second transistor in said pair being connected to said DC voltage generating means for supplying with said DC voltage;

means for taking out a first and second pulse from the collector of said first transistor and the collector of said second transistor respectively when noise whose amplitude is greater than said DC voltage is supplied to the base of said first transistor in said pair;

a first noise inverter which is connected between said second terminal of said separator and a power supply being responsive to said first pulse supplied from the collector of said first transistor so as to cancel noise generated in said first terminal of said separator;

a second noise inverter which is connected between an input terminal of an automatic gain controlling circuit which is connected to said video amplifier and ground being responsive to said second pulse so as to cancel noise contained in said composite video signals which are supplied to said automatic gain controlling circuit.

7. A noise detecting circuit for television receivers as claimed in claim 6 wherein said first constant current circuit including a fourth transistor whose base is supplied with a constant voltage; said second constant current circuit including a fifth transistor whose base is supplied with a constant voltage.

8. A noise detecting circuit for television receivers comprising;

a first transistor for amplifying composite video signals supplied from a video detector to the base of said transistor;

a second transistor for separating synchronizing signals from said composite video signals which are supplied to the base of said second transistor;

DC voltage generating means which are connected between the emitter of said second transistor and ground including a capacitor and a first constant current circuit connected in parallel for generating a DC voltage whose value is proportional to the peak value of said synchronizing signals;

a pair of transistors whose emitters are connected to ground through a second constant current circuit so as to maintain constant the sum of the emitter current in said pair, and the base of said first transistor in said pair being connected to the emitter of said first transistor through a voltage divider for supplying with said composite video signals and the base of said second transistor in said pair being connected to the emitter of said second transistor for supplying with said DC voltage;

means for taking out a pulse from the collector of said first transistor in said pair when noise whose amplitude is greater than said DC voltage is supplied to the base of said first transistor in said pair;

a noise inverter connected between the collector of said second transistor and a power supply including a third transistor whose base is connected to the collector of said first transistor in said pair so as to cancel noise generated to the collector of said second transistor when said pulse is supplied to the base of said third transistor.

9. A noise detecting circuit for television receivers comprising;

a first transistor for amplifying composite video signals supplied from a video detector to the base of said transistor;

a second transistor for separating synchronizing signals from said video signals which are supplied to the base of said second transistor;

DC voltage generating means which is connected between the emitter of said second transistor and ground including a capacitor and a first constant current circuit connected in parallel for generating a DC voltage whose value is proportional to the peak value of said synchronizing signals;

a pair of transistors whose emitters are connected to ground through a second constant current circuit so as to maintain constant the sum of the emitter current in said pair, and the base of said first transistor in said pair being connected to the emitter of said first transistor through a voltage divider for supplying with said composite video signals and the base of said second transistor in said pair being connected to the emitter of said second transistor for supplying with said DC voltage;

means for taking out a first and second pulse from the collector of said first transistor in said pair and the collector of said second transistor in said pair respectively when noise whose amplitude is greater than said DC voltage is supplied to the base of said first transistor in said pair;

a noise inverter connected between the collector of said second transistor and a power supply including a third transistor whose base is connected to the collector of said first transistor in said pair so as to cancel noise generated in the collector of said second transistor;

a second noise inverter connected between an input terminal of an automatic gain controlling circuit which is connected to the emitter of said first transistor and ground including a fourth transistor whose base is connected to the collector of said second transistor in said pair for cancelling noise contained in said video signal supplied from said first transistor to said automatic gain controlling circuit;

10. A noise detecting circuit for television receivers as claimed in claim 9 wherein said first constant current circuit including a fifth transistor whose base is supplied with a constant voltage; said second constant current circuit including a sixth transistor whose base is supplied with a constant voltage.

* * * * *